Nov. 25, 1969 — M. M. SEELOFF — 3,480,194
STRIP EDGE DETECTION FOR MACHINE FUNCTION INITIATING DEVICE
Filed Sept. 18, 1967 — 2 Sheets-Sheet 1
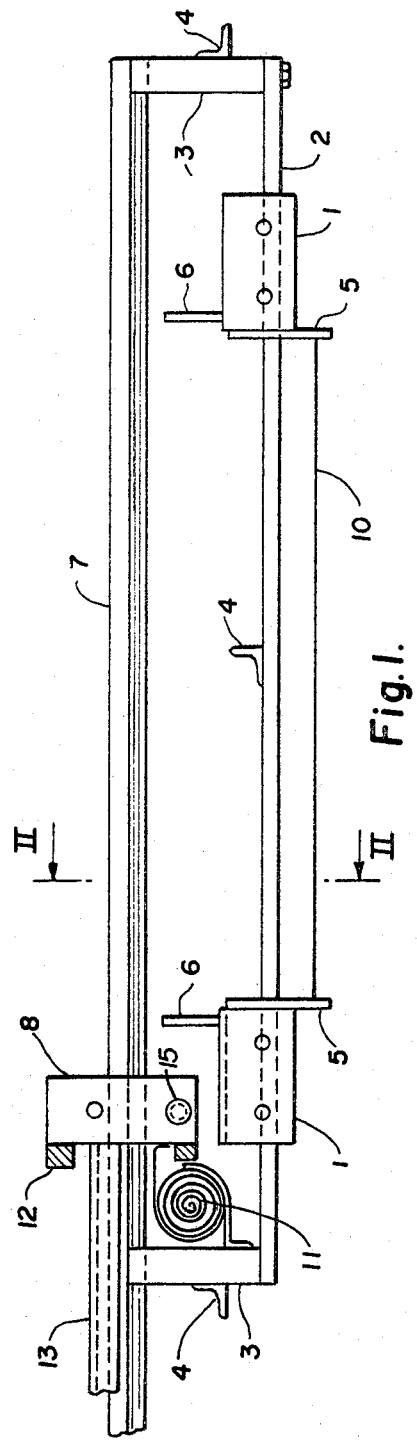
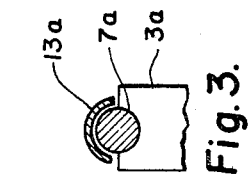
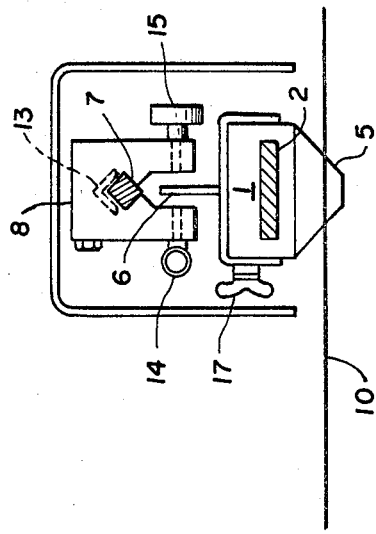
INVENTOR.
MELVIN M. SEELOFF
BY
his ATTORNEY Nov. 25, 1969  M. M. SEELOFF  3,480,194
STRIP EDGE DETECTION FOR MACHINE FUNCTION INITIATING DEVICE
Filed Sept. 18, 1967  2 Sheets-Sheet 2

INVENTOR.
MELVIN M. SEELOFF
BY
his ATTORNEY

United States Patent Office 3,480,194
Patented Nov. 25, 1969

3,480,194
STRIP EDGE DETECTION FOR MACHINE FUNCTION INITIATING DEVICE
Melvin M. Seeloff, Warren, Ohio, assignor to The Taylor-Winfield Corporation, Warren, Ohio
Filed Sept. 18, 1967, Ser. No. 668,487
Int. Cl. B23q *15/00;* B23k *37/02*
U.S. Cl. 228—8                                    10 Claims

ABSTRACT OF THE DISCLOSURE

Strip edge detecting means to accurately detect the edges of very thin strips, without damage thereto, to precisely control machine functions, such as welding functions to secure metal strips in end-to-end relationship. A linear induction motor is used as a detector in a uniquely different than normal manner, that is, having its normal armature fixed and its normal stator slidable on the fixed armature so that a gauge plate on the slidable stator will engage the strip edge. The slidable stator also carries an adjustable switch actuating element for actuating a switch mounted on a carriage which is slidable on a stationary slide. A machine processing device, such as a welder, flash stripper or planisher, controlled by said switch, has a carriage portion also slidable on said stationary slide to push the switch supporting carriage away from a "stand-by" stop, towards which a return spring normally presses it. This makes movements or strokes of the sheet detector independent of strokes of the strip processing device.

BACKGROUND OF THE INVENTION

In general practice, metal strip ends are joined together by resistance, spot, or seam welding, by any of the arc fusion methods, or by various mechanical means, such as riveting or metal stitching. In any of these processes, it sometimes become necessary to initiate the start of the process at various points relative to the edge of the strip. This is also true at the exit edge of the strip.

In some of the welding processes, especially those incorporating resistance welding, the strip joining functions of current and pressure must be precisely controlled to produce a satisfactory joint, especially at the strip edges. For instance, when resistance seam welding a strip joint, the metal at the start and exit edges of the strip will flatten out to a near knife edge because of the current and pressure employed to make the weld. There are times when this knife edge is unacceptable. In such cases, by precisely controlling the point of application of the weld current and pressure, the knife edge condition can be practically eliminated.

In other processes applied to the welded joint, such as planishing or swaging, the controlling of the points of application of the planishing or swaging pressures relative to the sheet edges must be precisely controlled to prevent the "thinning down" of the joint at the strip edges.

Sheet edge detecting devices are now in common use for the above mentioned reasons. They are usually types employing mechanically operated limit switches, proximity switches or photo-electric switches, and devices which use the strip edges themselves as an electrical path to close the switch circuit. They are most generally of the type that need not be adjusted for different widths of strip, which is most desirable, and the basic reason why the machine functions are initiated from the strip edges, rather than by cams or other fixed means on the machine proper.

All of the above types of detecting devices have their deficiencies as will be explained hereinafter.

The mechanical limit switch type is usually made so that the switch or switches are usually energized by the operating means (usually a roller) climbing up onto the strip at the entry edge and rolling down off the strip at the exit edge. It will be readily seen that the adjustment of said switches is quite critical, the setting being determined by the minimum thickness of strip to be joined. The minimum thickness of strip to be joined may be as thin as .006 inch and on the same machine the maximum thickness may be .125 inch. It will be readiy seen that such a wide variation in strip thickness would cause a variation in the point where the switch is tripped relative to the strip edge. A wrinkled strip edge would also cause such a variation.

The proximity switch type usually works in conjunction with a means to move said switch or switches into close proximity with the strip. The control of the movement of the switch moving means is usually by air or hydraulic cylinders. The speed and pressures in these motivating cylinders is difficult to accurately control because of frictional changes in the cylinders.

Photoelectric switching devices have been extensively used but have one serious deficiency and that is, malfunction as the result of dirt. Accumulation of dust particles on the lenses, on their reflector strips when used, variations in the intensity of the light in the shop (between bright days and dull days) all have a bearing in the operation and accuracy of the photo cells.

The last mentioned device, which uses the strip edges themselves as an electrical path to close the switch circuit, as described in pending U.S. patent application Ser. No. 625,085, assigned to the present assignee, is an excellent device but costly to build when equipped with means to accurately control the point of application of the current and pressure to prevent undesirable conditions at the strip edges.

SUMMARY OF THE INVENTION

An object of the present invention is to provide a novel sensing unit that will overcome all the deficiencies of wide variations in strip thickness, uneven strip condition, dirt, variations in speed due to fritcion, ambient light changes, strip damage, etc., described above.

It was first determined that to obtain the accuracy desired and to eliminate any adjustments because of change in width of strips, it would be necessary to use the edges of the strip as the position setting means. This presented a real problem when joining the thin gauge material, such as .006 to .012 inch thick. These thin materials will crumple or wrinkle at the strip edges if too much pressure is exerted by the strip edge detecting device. Too much side pressure by opposing strip edge detecting devices will cause the strip to buckle or hump in the middle.

Air and hydraulic means, such as cylinders and the like, have been employed to actuate the sheet detecting means. Such devices, due to frictional changes, pressure regulating problems, etc., are difficult to keep in precise working order to eliminate said wrinkling and humping. Servo mechanisms can be employed but are very costly and have to be maintained by skilled personnel.

A more specific object of the invention is to overcome the above mentioned problem by the use of linear induction motors as the motivating means for detecting the strip edges. These are well known commercial units that are low in cost and their frictional characteristics are relatively constant. However, they are used in a unique and unconventional way in their application to the present invention. In particular, with these linear iduction motor units, the forces exerted on the strip edges can be made very small and can be minutely and precisely regulated, electrically, by a very simple adjustment of a variable transformer.

The linear induction motor is a simple electro-mechanical device that provides a long stroke at uniform force. There are two basic parts to the actuator—the armature and the stator. Linear motion of the armature is induced by a sweeping magnetic field along the length of the stator, which is essentially a series of coils. It operates on three phase alternating current, or, with a capacitor, on single phase alternating current. Simple mechanical switching reverses the sweep of the field, and hence the direction of travel of the armature. The output force of the actuator is constant throughout its full stroke. Its force is directly proportional to input power which can be easily and accurately controlled by a variable transformer.

The linear induction motor itself is a commercial item, therefore its design, per se, does not constitute a part of this invention. It is the very unusual arrangement and unique application of this device that constiuttes the heart of the present invention.

It should be noted that normally, in linear induction motors, the armature is movable and reciprocates in relation to the stationary stator. However, in the present invention, the armature is rigidly and stationarily fastened, instead, thus allowing the normally fixed or stationary stator unit to reciprocate back and forth on said armature with such forces that are determined by the variable transformer. Either method can be used without changing the scope of the invention.

It is also determined that it was of paramount importance that the switch tripping means bear a pre-determined relationship to the plate of the strip edge detecting means which contacts the strip edge. This was done by adjustably mounting the switch tripping means directly on the strip edge detecting means. Any movement of the strip edge detecting means will result in a corresponding movement of the switch tripping means.

BRIEF DESCRIPTION OF THE DRAWING

Other objects and advantages of the invention will become more apparent from the following description of the invention taken with the accompanying drawing wherein:

FIG. 1 is a top or plan view of a linear induction motor, modified as a strip edge sensor in accordance with the teachings of the present invention;

FIG. 2 is a cross-sectional view taken along line II—II of FIG. 1; and

FIG. 3 is a cross-sectional view of a modification.

DESCRIPTION OF A PREFERRED EMBODIMENT

Figure 4:
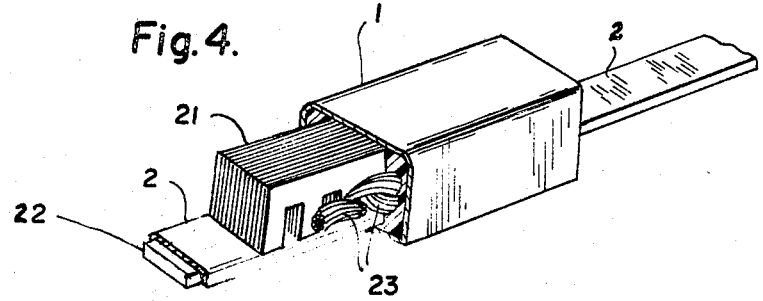

Numeral 10 denotes the strip whose leading and trailing edges are to be detected. The strip may be elongated steel sheets in a production line or may even be of paper, plastic or other material. Linear actuators 1 which are normally the stationary stators of linear induction motors, are uniquely employed as moving stators instead, which propel themselves along the motor armature 2 which instead of moving, as in conventional linear induction motors, is stationarily mounted on supports 3 which are, in turn, fastened to brackets 4 which are rigid or frame portions of the strip joining machine proper.

The linear induction motor provides a long stroke at uniform force. Linear motion is induced by a sweeping magnetic field along the length of the stator which is essentially a series of coils. It operates on three phase alternating current, or, with a capacitor, on single phase alternating current. Simple mechanical switching reverses the sweep of the field, and hence the direction of travel of the armature. The output force of the actuator is constant throughout its full stroke. Its force is directly proportional to input power which can be easily and accurately controlled by a variable transformer or resistor.

Fastened to the face of the moving stators 1 are the strip gauging plates 5. Armatures 2 may be "Teflon coated" for low friction and wear characteristics, if desired. Also mounted on the moving stators 1 are the adjustable means 6 for tripping the switch 15 or switches. This switch tripping means may be in the form of a vane, a pin, or a cam, depending upon the type of switch. For example, an air jet supply tube 14 conducts an air jet to air switch 15, which jet may be interrupted by switch tripping means 6. Instead of a jet stream, movable electrical contacts (not shown) may be employed, which are operated by tripping means 6. An adjustment means 17 is provided to position the switch tripping means 6 so that the energization of said switches will either lead or lag the strip edges.

It should be apparent that although only a single switch is shown together with a pair of linear motors, any single or multiple combinations of these units, which are joined together to operate separate functions of the strip edge detector, could be used within the scope of the invention. Linear induction motors are very well suited as the detectors embodying the present invention since their frictional characteristics are relatively constant and since their pressures may be reduced to very light pressures.

Rigidly mounted on the top of supports 3 is a guide bar 7 which is shown square in section but which could be of any shape commonly used as slide ways.

Slidably mounted on guide bar 7 is a suitable bracket 8 on which is mounted switching means 15, of any well known type, such as conventional limit switches, switches that operate on the interrupted air jet principle, proximity switches and the like.

Fastened to the bracket 8 is a constant pressure coiled spring 11 which returns the switch bracket 8 to its "at rest" position against stop 12.

A means will be normally employed to move the switching means along the rigid guide bar 7. In the illustrated embodiment, an angle iron bar 13 is used, one end of which is fastened to the reciprocating carriage which carries the joint processing equipment (not shown) such as a welder, flash trimmer or planisher. The other end of the angle iron bar 13, shown in FIG. 1, butts against the switch bracket 8 without being fastened thereto.

Since the carriage travel in most instances is greater than what is necessary for the switching means, no rigid connection is made between the end of the pusher or angle iron bar 13 and the slidable switch bracket 8. In fact, in normal operation, the carriage travel might be double of what is required of the switching means, in which cases there will be a variable gap between the end of the angle bar 13 and switch bracket 8. By reason of this type of construction, the overall stroke of the switching means is determined by the strip's width which makes said stroke independent of the stroke of the carriage which carries the strip processing unit.

By nature of the overall design of the processing equipment, the length of the pusher bar 13 becomes quite long, therefore, its free end should be supported throughout its stroke to prevent sagging. In the present design, this free end is constantly supported and guided by letting said ends ride the guide bar 7. The angular surfaces of bar 13 correspond to, and are guided by, the angular surfaces of bar 7 (FIG. 2).

It is conceivable, however, that bar 7 could be made of round cross section 7a (see FIG. 3) supported by half round saddle 3a with the pusher bar being on half round design as denoted by numeral 13a. Such a section would achieve the same simple supporting and guiding means. Similarly, other cross sections may be used instead.

The operation of the complete unit is briefly as follows.

After the strip 10 is positioned in the strip joining machine, the moving stators of the linear motor or motors are energized which move them toward each other until their gauge plates 5, mounted rigidly on the moving motor stators 1, bear against the side edges of the strip. This positions the previously adjusted switch tripping means 6, also rigidly mounted on the moving stators in direct relation to the strip edges.

At this point the motivating means of the carriage, which carries the strip joining means, is energized to move said carriage across the strip. Pusher bar 13, which is fastened to and moves in unison with said carriage, freely moves forwardly until it contacts the switch carrying bracket 8. From this point on, to the end of the carriage stroke, bracket 8 is moved along guide bar 7. Along the path of travel of bracket 8 are the preset switch tripping means 6 whose positions are determined by the strip edge detecting position of moving stators 1.

Such strip tripping means 6 may be set in fixed relationship to each other to determine the point of energization of various functions of the strip joining means. One might initiate the welding cycle and the other might stop it, for example. Such control might also be applied to a planisher or other strip processing device.

At the end of the strip joining cycle, the carriage movement is reversed. A constant pressure means, such as spring 11, keeps switch bracket 8 against the end of the pusher bar 13 until bracket 8 contacts the stationary stop block 12 and is brought to rest. The carriage now continues to its "home or at rest" position, thus a gap is established later between the end of the pusher bar 13 and the switch bracket 8.

It should be understood, that although a pair of moving stators, a pair of switches and a pair of switch tripping means are shown, any single or multiple combinations of these units can be employed within the scope of this invention.

While a linear motor of any well known type would be useful in providing the required rectilinear motion for the detector of the present invention, it is preferable to eliminate the reciprocating iron rods, bars or armature structures of typical linear motors.

Figure 5:
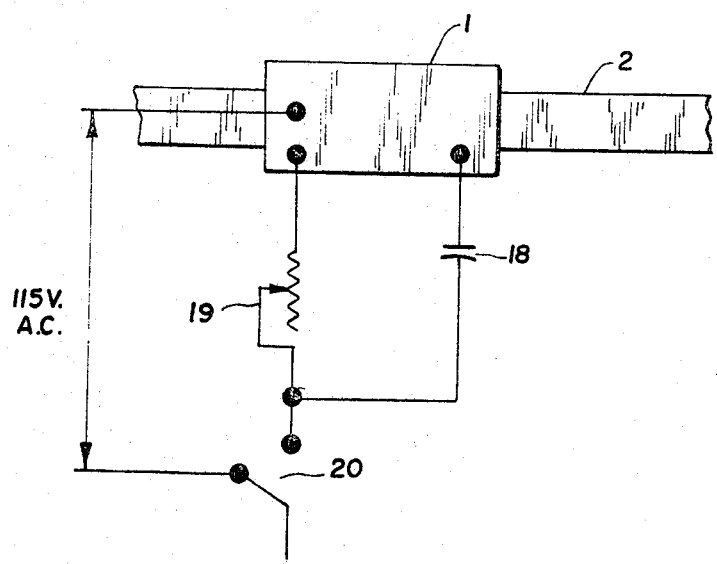

FIGS. 4 and 5 show such actuator and a typical control circuit. Linear actuator 1 comprises a housing which encloses a mass of plastic material, such as epoxy, in which is encapsulated or embedded multi-strand windings 23 extending through a magnetic core 21 which, together with the housing, serves as the movable element or armature. The pole faces of core 21 are slidable on a channel-shaped stationary element or stator 2 of copper, aluminum, monel, stainless or other non-magnetic, electrically conductive metals. The stator 2 may be extended as a track as shown in FIG. 1. Slidable on stator 2 is also the stationary return iron 22 or other magnetic material serving as part of the movable element rigidly connected to the housing.

FIG. 5 shows a typical circuit for varying the speed comprising a source of 115 volt A.C. potential applied to a variable, slide wire resistor 19 and a capacitor 18 through a switch 20. Instead of a resistor, a variable transformer or equivalent element may be used to vary the current flow through windings 23. There is no variation in current with relation to armature position or stroke length. Reversal of the current may be effected by a simple single pole, double throw switch (not shown).

While the copper element 2 may serve as the stator on which the entire housing assembly slides, including core 21 return iron 22 and windings 23, it should be noted that particularly where faster speeds are desired, these parts may be reversed. That is, the assembly including the housing, core 21, winding 23 and return iron 22 may serve as the stator while the copper channel element 2 alone, which is of very low inertia, may serve as the movable element or armature. Thus very high acceleration of movable element 2 may be obtained. Variable speeds from 40 to 700 inches per second are readily attainable and the theoretical acceleration at stall is over 1200 feet per second.

The armature speed can be equal or widely varied in each direction of travel. Output forces of from 1 to 600 pounds are readily obtainable from an actuator which is only 6 inches long and 4 inches square powered by a single phase supply. On three phase operation, higher outputs are obtainable. Output force and speed are continuous and non-variable throughout any stroke length. Force is proportional to input power and may be made to vary, if desired, to any degree or by fixed ratios. Combining units on one armature increases the force in relation to the number of units.

Thus it will be seen that I have provided an efficient strip edge detector which is particularly suitable for use in machines for welding in end-to-end relationship, very thin metal sheets, and employing in a unique way, one or more linear induction motors in which the normal stator is used as the movable element to engage the edge of the sheet without buckling or damaging the very thin sheet. It is to be understood that the normal stator could be held stationary and the armature made movable, with the gauging plates and switch tripping means mounted thereon without changing the scope of this invention.

Thus it will be seen that I have provided an efficient strip edge detector illustrated and described in several embodiments of my invention, however, it will be understood that it is by way of illustration only, and that various changes and modifications may be made within the contemplation of my invention and within the scope of the following claims.

I claim:

1. A detecting device for detecting the edge of a sheet, comprising a linear motor having its normal armature stationarily mounted and having its normal stator slidably mounted on said stationary armature for linear movement relative thereto, to enable engagement of said slidable stator with an edge of said sheet, actuating means mounted on said slidable stator, and an electric switch movable in unison with a sheet processing unit so as to be actuated by said switch actuating means after a predetermined movement of said unit.

2. A detecting device as recited in claim 1 together with a second linear motor having its stator slidably mounted on said stationary armature to enable engagement with the opposite edge of said sheet, and switch actuating means mounted on said second stator for controlling said sheet processing unit.

3. A detecting device as recited in claim 1 together with a gauging plate mounted on said slidable stator for direct engagement with the edge of the sheet, said stationary armature extending across and parallel with the width of said sheet and serving as the armature for both detecting stators.

4. A detector as recited in claim 1 together with a stationary guide bar in spaced parallel relationship with said stationary armature, a carriage slidable on said guide bar, and switching means carried by said carriage and actuated by said switch actuating means upon predetermined movement of said carriage is responsive to movements of said strip processing unit.

5. A detecting device as recited in claim 1 together with adjusting means for adjusting the position of said switch actuating means relative to said slidable stator.

6. A detecting device as recited in claim 4 together with a fixed "stand-by" stop and a return spring for continuously urging said carriage toward said stop, said strip processing unit being engageable with said carriage to push it away from said stop against the action of said return spring so as to be actuated by said switch actuating means, and whereby when said carriage engages said stop and is in "stand-by" position, said strip processing unit may be retracted therefrom and moved independently of said carriage.

7. Sheet edge detecting control apparatus, comprising a pair of electromagnetic detectors disposed on opposite sides of the sheet, each detector comprising a stationary non-magnetic element and a relatively movable electromagnetic element adapted to engage the side of the sheet upon energization of said movable electromagnetic element, a switch operating element mounted on at least one of said movable electromagnetic elements, a movable portion of a machine for effecting a processing function, a switch for controlling said processing function, a carriage mounted on a guide bar for supporting and reciprocating said switch in spaced parallel relationship across the width of said sheet and along a path so as to engage said switch operating element, said movable portion of the machine being movable indepnedently of said carriage when retracted from said sheet but being engageable with said carriage to move it along said guide bar when moved in a direction toward the sheet.

8. Sheet edge detecting apparatus as recited in claim 7 wherein said detectors are linear motors whose movable elements comprise a series of coils which, when energized, effect engagement with the edges of said sheet, and wherein said processing function is a welding function for welding the end of said sheet to that of another sheet.

9. Sheet edge detecting apparatus as recited in claim 8 together with a stationary stop located at the "stand-by" position of said detector, and return spring means mounted on a stationary element of said machine for urging said carriage toward said stop and which yieldably resists movement of the carriage in an opposite direction by said movable portion of the machine.

10. Sheet edge detecting means as recited in claim 9 wherein said detectors are linear induction motors wherein the normal stator is used, instead, as a movable armature provided with a gauge element for engaging a side edge of the sheet, and wherein the normal armature is fixed, and wherein said switch actuating element is adjustably mounted on said movable armature for effecting selective control of the welder in accordance with the position of the edge of the sheet.

References Cited
UNITED STATES PATENTS 3,370,771  2/1968  Shay _____ 228—8
3,190,525  6/1965  Foley _____ 228—10

JOHN F. CAMPBELL, Primary Examiner

R. J. CRAIG, Assistant Examiner

U.S. Cl. X.R.
228—9, 10